US007600128B2

(12) United States Patent  
Pritchard et al.

(10) Patent No.: US 7,600,128 B2
(45) Date of Patent: Oct. 6, 2009

(54) TWO-FACTOR COMPUTER PASSWORD CLIENT DEVICE, SYSTEM, AND METHOD

(75) Inventors: James B. Pritchard, Fairview, TX (US); Sidney L. Weatherford, Richardson, TX (US); Steven W. Smith, Dallas, TX (US)

(73) Assignee: 5th Fleet, LLC, Richardson, TX (US)

( * ) Notice: Subject to any disclaimer, the term of this patent is extended or adjusted under 35 U.S.C. 154(b) by 946 days.

(21) Appl. No.: 11/268,204

(22) Filed: Nov. 7, 2005

(65) Prior Publication Data

US 2006/0070125 A1 Mar. 30, 2006

Related U.S. Application Data

(63) Continuation-in-part of application No. 11/061,223, filed on Feb. 18, 2005, now Pat. No. 7,581,113, which is a continuation-in-part of application No. 09/783,049, filed on Feb. 14, 2001, now Pat. No. 7,043,640.

(51) Int. Cl.
*H04L 9/32* (2006.01)
*H04L 9/00* (2006.01)
*G06F 21/00* (2006.01)
*G06F 7/04* (2006.01)

(52) U.S. Cl. .................. 713/184; 713/183; 726/28; 726/29

(58) Field of Classification Search ........... None
See application file for complete search history.

(56) References Cited

U.S. PATENT DOCUMENTS 4,197,524 A 4/1980 Salem
4,455,588 A 6/1984 Mochida et al.
4,621,334 A 11/1986 Garcia
4,805,222 A 2/1989 Young et al.
5,241,594 A 8/1993 Kung
5,592,553 A * 1/1997 Guski et al. .............. 713/159

FOREIGN PATENT DOCUMENTS

JP 11015900 A * 1/1999
JP 11134301 A * 5/1999

OTHER PUBLICATIONS

RSA Security, Authenticators, *The Gold Standard in Two-Factor User Authentication*, www.rsasecurity.com, Feb. 15, 2005.

* cited by examiner

*Primary Examiner*—Nasser G Moazzami
*Assistant Examiner*—Fatoumata Traore
(74) *Attorney, Agent, or Firm*—Steven W. Smith

(57) ABSTRACT

A client device, system, and method for constructing a two-factor password utilized by an authentication device to authenticate an accessing computer. The client device connects to the accessing computer through an input/output (I/O) port such as a USB connection. When a user desires to access a network, he enters a user ID, which is sent from the accessing computer to the client device. The client device includes a client application, which retrieves a second factor from an internal database, and combines the user ID and the retrieved second factor to form the two-factor password. The two-factor password is sent to the accessing computer, which transmits it to the authentication device. The accessing computer is authenticated only if both the user ID and the second factor match a user ID and second factor stored in the authentication device.

17 Claims, 12 Drawing Sheets

TWO-FACTOR COMPUTER PASSWORD CLIENT DEVICE, SYSTEM, AND METHOD

RELATED APPLICATIONS

This application is a continuation-in-part of co-pending U.S. patent application Ser. No. 11/061,223 filed Feb. 18, 2005, which is a continuation-in-part of co-pending U.S. patent application Ser. No. 09/783,049 filed Feb. 14, 2001, the entire disclosures of which are incorporated by reference herein.

BACKGROUND OF THE INVENTION

1. Technical Field of the Invention

The present invention is directed, in general, to computer security systems. More particularly, and not by way of limitation, the present invention is directed to a system and method for generating and authenticating a two-factor password to protect a computer system from unauthorized access.

2. Description of Related Art

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "hackers." The popular definition of a hacker refers to individuals who gain unauthorized access to computer systems for the purpose of stealing and/or corrupting data. Hackers are known for breaking into supposedly secure computer systems and damaging web sites, credit card accounts, internal databases, and the like.

Hacker software tools include programs that try many combinations of numbers and letters over a set period of time in an attempt to compromise a password-protected system. On some computer operating systems, as each letter or number is presented by the hacker, the letter or number is confirmed by the system as being correct or incorrect. This serial confirmation sequence actually makes it easier for a hacker to gain entry because fewer combinations of letters and numbers have to be tried. On other operating systems, the password must be completely entered correctly before confirmation is supplied by the system. This may slow down the password discovery process, but with time, the hacker can eventually present a correct password to the target computer system.

In one existing solution, the user creates a two-factor password whenever the user logs on. The first factor is the user's personal identification number (PIN), which the user enters as the first part of the password. The user obtains the second factor from an electronic token, which displays a 6-digit number. The token is time-synchronized with the authentication server, and the number displayed on the token changes every minute. The user enters the 6-digit number displayed on the token as the second part of the password. Any hacker who has learned the user's PIN cannot gain access because the hacker does not know the second factor, i.e., the 6-digit number from the token.

This two-factor password works well, but has several disadvantages. First, if a user does not have his token with him, he cannot log in. Second, if the token breaks or the battery fails, the user cannot log in. Third, even if everything works as advertised, the user has the burden of having to look at the token and enter a different 6-digit number, in addition to the user's PIN, every time he logs on. If a company has a network that kicks the user off every 5-10 minutes if he doesn't continually use the computer, entering the extra token number every time he logs back on becomes a serious burden.

Therefore, a need exists in the art for an improved system and method for generating and authenticating a password to protect a computer system from unauthorized access. In particular, there is a need for a client device, system, and method that is simple to implement and capable of providing virtually hacker-proof protection for an online computer system. The present invention provides such a client device, system, and method.

SUMMARY OF THE INVENTION

In one aspect, the present invention is directed to a client device for constructing a two-factor password utilized by an authentication device to authenticate an accessing computer. The client device includes an input/output (I/O) port for interfacing the client device with the accessing computer, the I/O port receiving a user identification (user ID) from the accessing computer, and sending the two-factor password to the accessing computer. The client device also includes a database for storing a second factor, and a client application connected to the I/O device and the database. The client application is adapted to retrieve the second factor from the database, combine the user ID and the retrieved second factor to form the two-factor password, and send the two-factor password to the I/O device for sending to the accessing computer.

In another aspect, the present invention is directed to a system for protecting a network against unauthorized access while enabling an authorized accessing computer to access the network. The system includes a client device that connects to the authorized accessing computer and constructs a two-factor password, and an authentication server connected to the network for receiving the two-factor password and authenticating the accessing computer. The client device includes an I/O port for interfacing the client device with the accessing computer, the I/O port receiving a user ID from the accessing computer, and sending the two-factor password to the accessing computer. The client device also includes a database for storing a second factor, and a client application connected to the I/O device and the database. The client application is adapted to retrieve the second factor from the database, combine the user ID and the retrieved second factor to form the two-factor password, and send the two-factor password to the I/O device for sending to the accessing computer. The authentication server includes means for receiving the two-factor password sent from the accessing computer; means for determining whether the received user ID matches a stored user ID associated with the accessing computer; means for determining whether the received second factor matches a stored second factor associated with the accessing computer; and means for positively authenticating the accessing computer only if the received user ID matches the stored user ID, and the received second factor matches the stored second factor.

In another aspect, the present invention is directed to a method of protecting a network against unauthorized access while enabling an authorized accessing computer to access the network. The method includes receiving a user ID from a user, and automatically constructing by the accessing computer, without further input from the user, a two-factor password comprising the user ID and a second factor added by the accessing computer. The method also includes sending the two-factor password to the authentication server; verifying by the authentication server that the two-factor password received from the accessing computer matches a stored two-factor password associated with the accessing computer; and granting the accessing computer access to the network only if the two-factor password received from the accessing computer matches the stored two-factor password associated with the accessing computer.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EMBODIMENTS

The present invention is an improved system and method for generating and authenticating a password to protect a computer system from unauthorized access. In the description herein, the computer system is described as a financial authorization network for exemplary purposes only. It should be understood that the invention is applicable to all types of password-protected computer systems.

Figure 1:
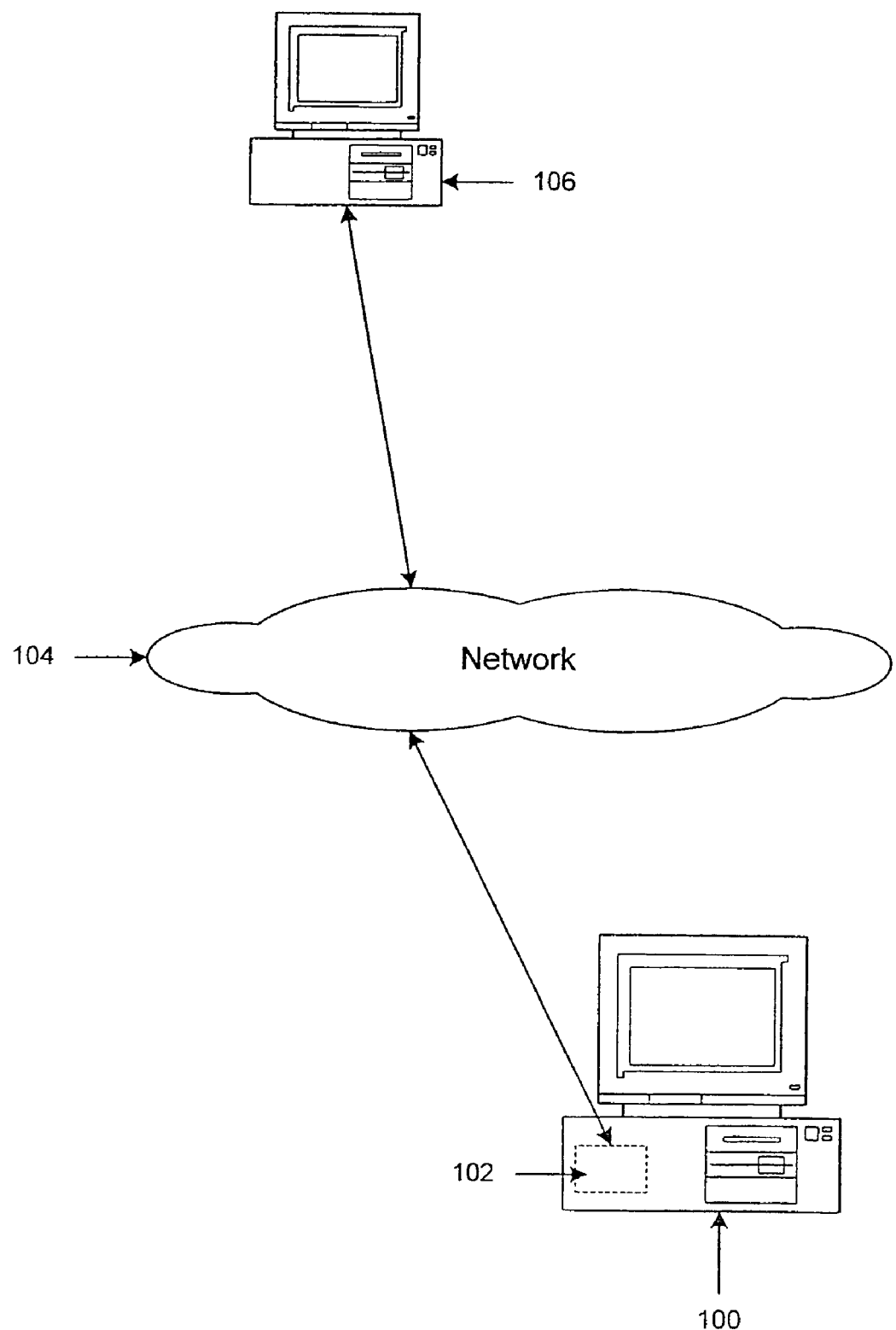
FIG. 1 is a high-level functional block diagram of an exemplary computer network system.

FIG. 1 depicts a high-level block diagram of an exemplary computer network system. Computer 100 contains a password protection system of the present invention. The present invention comprises executable computer program instructions in a computer program that may be installed in computer 100 to monitor incoming signals and data from computer network 104. A detection portion of the executable program instructions monitors and compares incoming signals with a stored series of predetermined signals. The detection portion of the executable program instructions may comprise a "terminate and stay resident" (TSR) program. The predetermined signals may represent letters, numbers, sounds, or any signals that are readable by a computer. A password builder portion of the executable computer program generates one or more "entry events." Each entry event is made up of one or more "entry signals." Two entry events may be separated by a predetermined time interval. A series of entry events separated by predetermined time intervals comprise a password of the present invention. The password is stored in a memory accessible by computer 100.

Communication between computer 100 and network 104 is accomplished utilizing network interface device (NID) 102. NID 102 can be a LAN connection, a WAN connection, cable modem, digital subscriber line (DSL) modem, wireline modem or any other means of connecting computer 100 with a network. Network 104 can be a LAN, a WAN, the Internet or any other network that is capable of sending/transmitting data between computers, telephones or any other electronic devices (smart houses, appliances, etc.) capable of transmitting and receiving data.

Computer 106 is connected to network 104 and may communicate with computer 100. Computer 106 may attempt to access data, files or programs that are resident on computer 100. Because computer 100 is protected by a password of the present invention, computer 106 must present a password attempt that is recognized by the TSR portion of the computer program that monitors NID 102 in order to gain access to computer 100. If a password attempt is presented by computer 106 and the TSR portion of the computer program residing in computer 100 rejects the password attempt, computer 106 is unable to communicate with or access computer 100. Only when computer 106 presents a password attempt that matches the stored password is access to computer 100 granted.

Figure 1A:
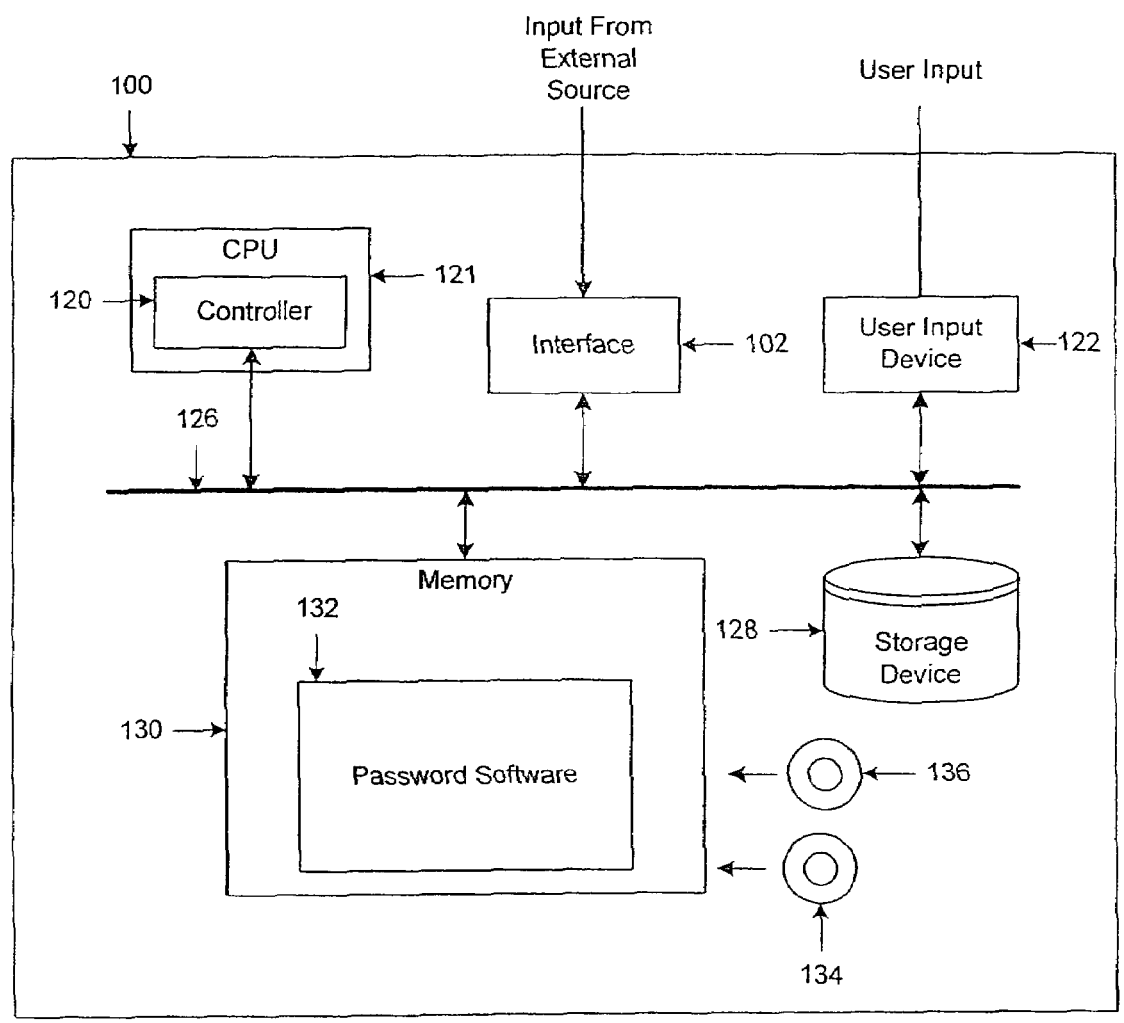
FIG. 1A is a high-level functional block diagram of an exemplary computer system in which a first embodiment of the present invention is implemented.

FIG. 1A illustrates a high-level block diagram of computer 100. Computer 100 generally comprises central processing unit (CPU) 121, memory 130, storage device 128, external interface 102, and user input device 122. These elements of computer 100 are connected by and communicate through computer bus 126.

Computer 100 comprises memory 130 that contains password software 132 of the present invention. Controller 120 is depicted in this particular embodiment as contained within CPU 121. Controller 120 and password software 132 together comprise a password controller that is capable of carrying out the present invention. An operating system program (not shown) coordinates the operation of password software 132 with the operating system of controller 120.

Password software 132, under control of controller 120, identifies password attempts and individual password segments as they are received via interface 102. Interface 102 may comprise a network device, a modem, or any external connection device. A password attempt may also be received via user input device 122. User input device 122 may comprise a keyboard, a mouse, a floppy disk, etc. Password software 132 can detect a password attempt received by computer 100 from devices that provide local input and from network or modem type devices that provide remote input. A password attempt may be detected by receiving an entry event that signals a password attempt is to follow.

Controller 120 is capable of receiving user instructions from user input device 122. In response to user instructions, controller 120 is capable of instructing password software 132 to create elements of a new password and to modify elements of a previously stored password, where the password elements may comprise characters, symbols, numbers and time intervals. Controller 120 operates a portion of password software 132 to detect a password attempt from an external source. An external source includes, without limitation, a network connection, a modem connection, and any input device connected to computer 100 such as a keyboard, a mouse, a hard disk drive, etc. Controller 120 also operates password software 132 for comparing password attempts with a stored password (not shown in FIG. 1A).

Password software 132 is stored in memory 130 which may comprise random access memory (RAM) or a combination of random access memory (RAM) and read only memory (ROM). Memory 130 may comprise a non-volatile random access memory (RAM), such as flash memory. In an alternate advantageous embodiment of the present invention, password software 132 may be stored on a mass storage device, such as hard disk 128. In another alternate advantageous embodiment of the present invention, password software 132 may be stored on an attached peripheral drive or a removable disk drive (whether embedded or attached) of the type that reads a Read/Write DVD or a re-writable CD-ROM. These types of disk drives are illustrated schematically in FIG. 1A by Read/Write DVD 134 and re-writable CD-ROM 136.

Figure 2A:
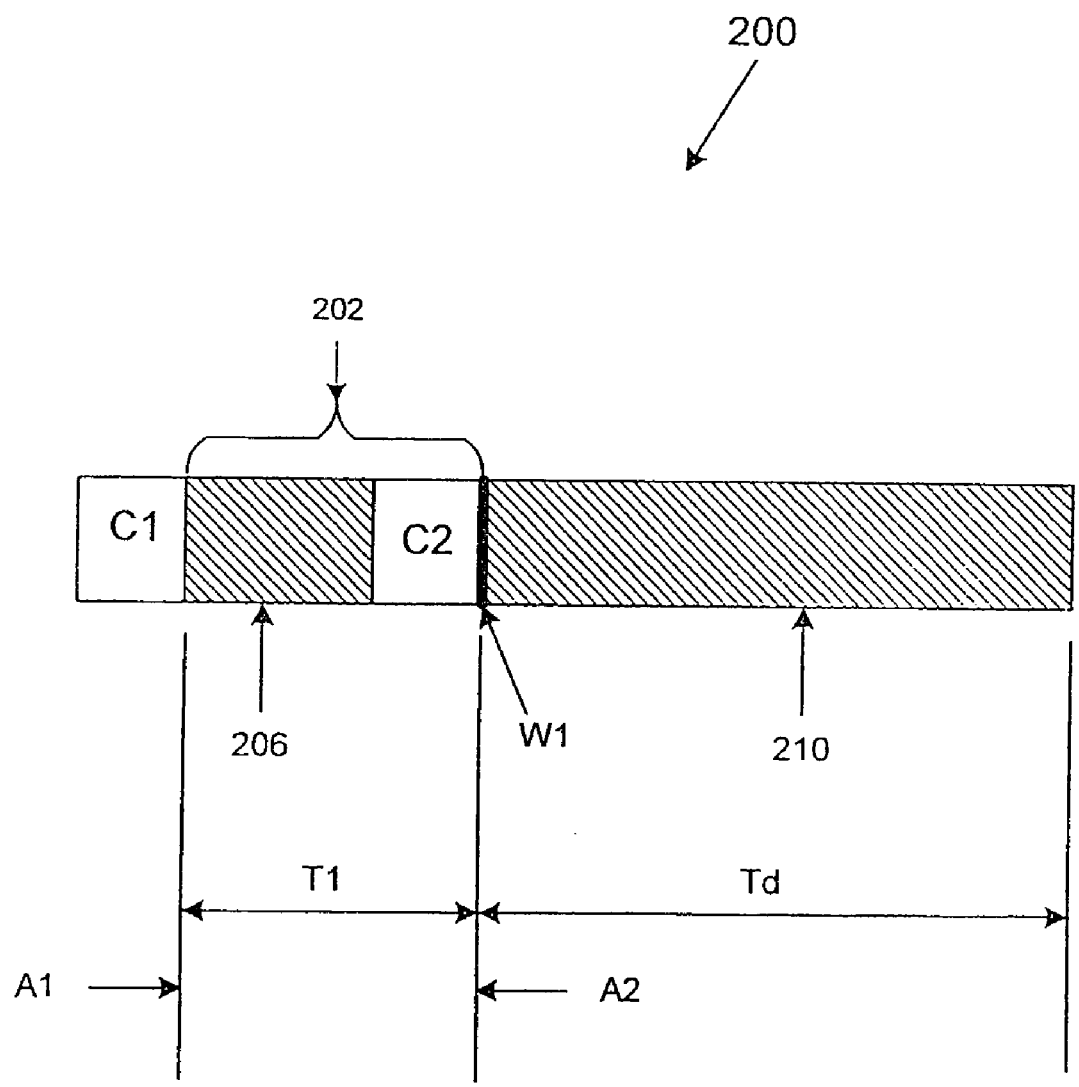
FIGS. 2A-E are illustrative drawings of exemplary embodiments of a method of separating password packets by time intervals in accordance with the teachings of the present invention.

FIGS. 2A-2E illustrate exemplary embodiments of the password of the present invention. FIG. 2A depicts a high-level time-line for password 200 containing password segment 202 that comprises time interval 206 and entry event C2. A password comparison sequence is initiated when the TSR portion of the computer program recognizes an initial entry event/signal C1. The TSR portion of the computer program begins comparison of the incoming signals with the signals of the stored password. Entry event C1 acts as a start/sync character for the password detection algorithm. An entry event and an entry signal may be the same. However, there may be a plurality of entry signals that are required to produce a character (or characters) or a symbol (or symbols), etc., that make up a single entry event.

Initial entry event C1 serves to trigger an interval timer (not shown), controlled by password software 132, by causing the interval timer to set (or reset) to zero at time A1. In this embodiment, the timer is set upon detection of the trailing edge of entry event C1. After being set to zero, the interval timer starts calculating time intervals (in increments that may range from nanoseconds to days) for the incoming password attempt for comparison with the time intervals that are predetermined and incorporated into the stored password.

After initial entry event C1 is recognized by password software 132, a predetermined time interval 206 must occur. Time interval 206 is a period during which there are no entry events or entry signals. Should a character or entry signal be detected during time interval 206, password software 132 recognizes the "out of place" entry event as an invalid password attempt. In response to an invalid password attempt, time delay 210 is added to the actual time required to read the presented password and then returned as "access denied." Time delay 210 is an arbitrary period of time that is generated and added by password software 132 to prevent revealing any timing parameters of the stored password.

Predetermined time interval 206 follows initial entry event C1. Time T1 (segment time) is measured from the trailing edge of initial entry event C1 and represents the total amount of time of time interval 206 and entry event C2. Predetermined time interval 206 can be a user specified amount of time or a random time interval generated by the password generating portion (not shown) of password software 132. The time required for entry event C2 (and all subsequent entry events) is calculated by using the serial bit transfer rate (baud rate) of the actual incoming signal. The length of predetermined time interval 206 is calculated by subtracting the time of entry event C2 from the segment time T1. The second entry event C2, is compared to an incoming entry event (one or more computer readable signals) received by computer 100. Alternatively, time T1 may be calculated by starting the interval timer at a signal within a first group of signals that form an entry event and the ending within a second group of signals that form a subsequent entry event.

In all computer systems, there exists an inherent delay in the computer's processing time, which must also be taken into account when measuring time intervals. In the apparatus and method of the present invention, a plus or minus percentage deviation in baud rate and processing time is addressed by providing deviation window W1. Deviation window W1 is a deviation period that accommodates the additional times required for computer 100 to recognize and read a character or group of characters. The period of deviation window W1 is based on the baud rate of the incoming signals. Generally, a deviation window is plus or minus a percentage of the preceding time interval (see Table 1). Computer 100 recognizes entry event C2 during deviation window W1 and establishes time T1. Time T1 includes a password segment's predetermined time interval 206 and the character recognition time associated with entry event C2. Time T1 must end within deviation window W1. Time interval 206, entry event C1, and entry event C2 must match the password stored in computer 100 in order to be a valid password attempt.

If time T1 does not end within deviation window W1, then password software 132 detects the error and rejects the password attempt as invalid. Arbitrary time delay Td is added before sending the rejection of the password attempt to computer 106 that is requesting access. If time T1 ends within deviation window W1, the interval timer (not shown) that provides timing for the algorithm of the stored password is stopped, reset to zero, and then re-started for arbitrary time delay Td. A plurality of interval timers may be used to monitor time T1, time interval 206 and arbitrary time delay Td. At the conclusion of arbitrary time delay Td, if a correct password attempt has been presented, a successful password entry is acknowledged and access is granted.

Each entry event comprises of one or more predetermined entry signals that represent one or more numbers, letters, sounds, symbols, characters, etc., in any combination in the password structure. Those skilled in the art will appreciate that an entry event can, and usually does, comprise a plurality of groups of signals that represent a password.

Figure 2B:
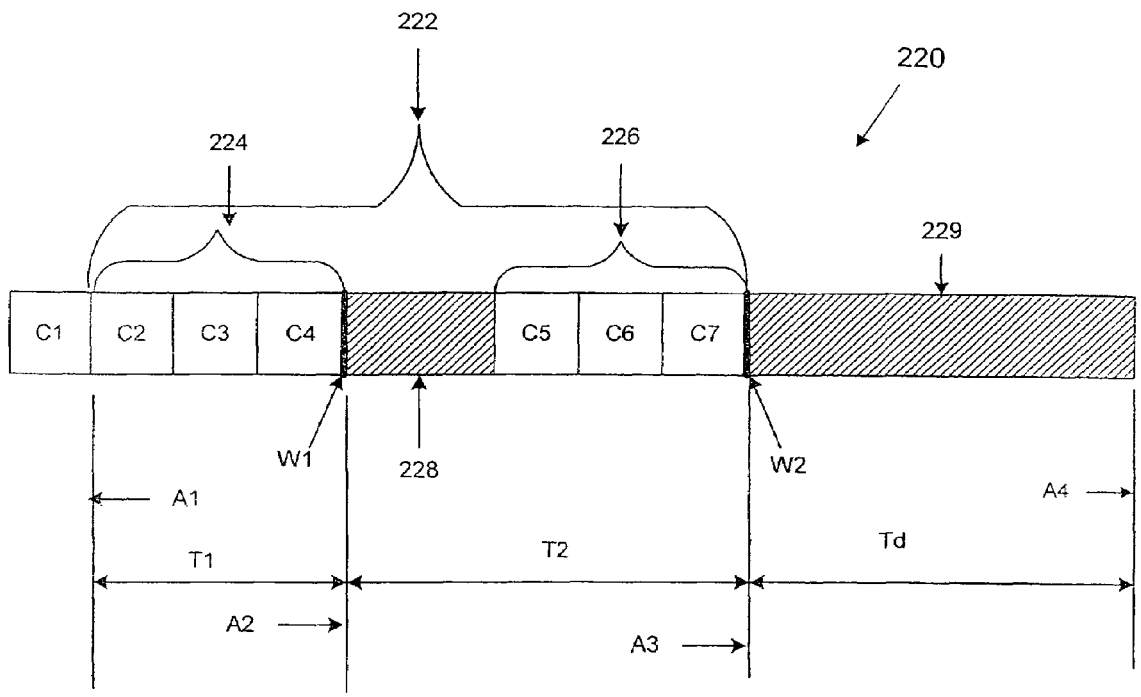

FIG. 2B illustrates a time-line of a password 220 according to another embodiment of the present invention. Password 220 comprises time envelope 222 (total time of the entire password 220) following an initial entry event C1, entry event 224 (comprising entry event C2, entry event C3, entry event C4, zero time interval and deviation window W1), time interval 228 and entry event 226 (comprising entry event C5, entry event C6, time interval 228, terminating entry signal C7 and deviation window W2). Each segment (at least one entry event) of the password must occur within password envelope 222. An arbitrary time delay, Td, that is equal to time segment 229 is then applied to the end of the password envelope 222 before sending an acceptance or a rejection of the presented password attempt to computer 106.

Figure 2C:
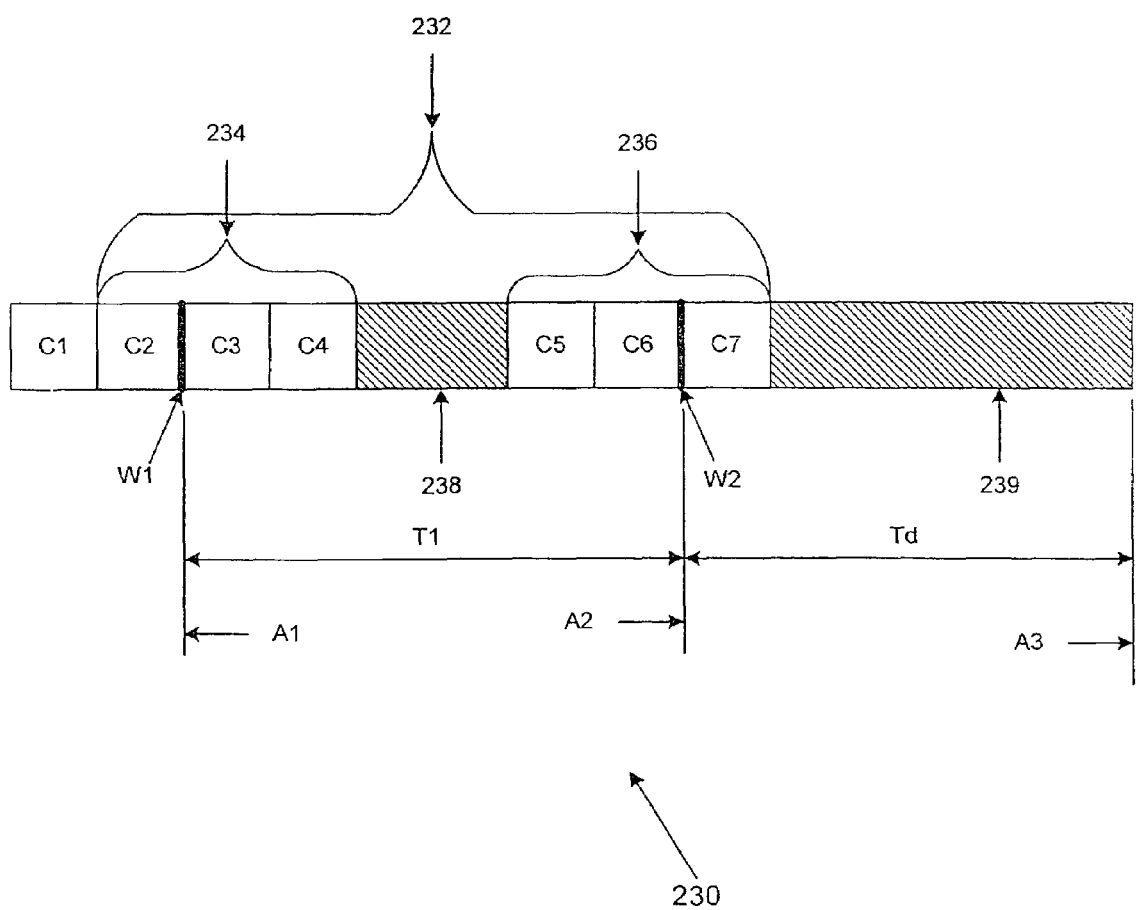

FIG. 2C illustrates a time-line of another password 230 according to another embodiment of the present invention. Password 230 comprises time envelope 232 following an initial entry event C1, entry event 234, time interval 238, entry event 236 and deviation windows, W1 and W2. Entry event 234 comprises entry signals C2, C3, and C4. Entry event 236 comprises entry signals C5, C6, and C7. In this embodiment, entry signal C1 is the initiating entry signal that triggers password software 132 to began comparing the incoming signals of a password attempt to the stored password. The total password 230, in this instance, comprises entry signals C2, C3, and C4, time interval 238, and entry signals C5, C6, and C7.

However, as predetermined by the user, interval timing begins at A1 in deviation window W1 after detecting the second entry signal at A1, continues through time interval 238, and ends in deviation window W2 upon detecting entry signal C6 at time A2. Then entry signal C7 is received. The password attempt is invalid if entry signal C7 is not detected. Password acceptance is delayed by an arbitrary amount of time Td. Time Td is the sum of the time of entry signal C7 and arbitrary time segment 239. Computer 100 then sends an "access denied" signal or an "access allowed" signal to computer 106 that is presenting the password attempt. The time Td is not a part of the presented password attempt and is not a part of the stored password. It is an element that is generated by password software 132 to mask the length of time envelope 232 so that computer 106 can not determine the length of the stored password.

Figure 2D:
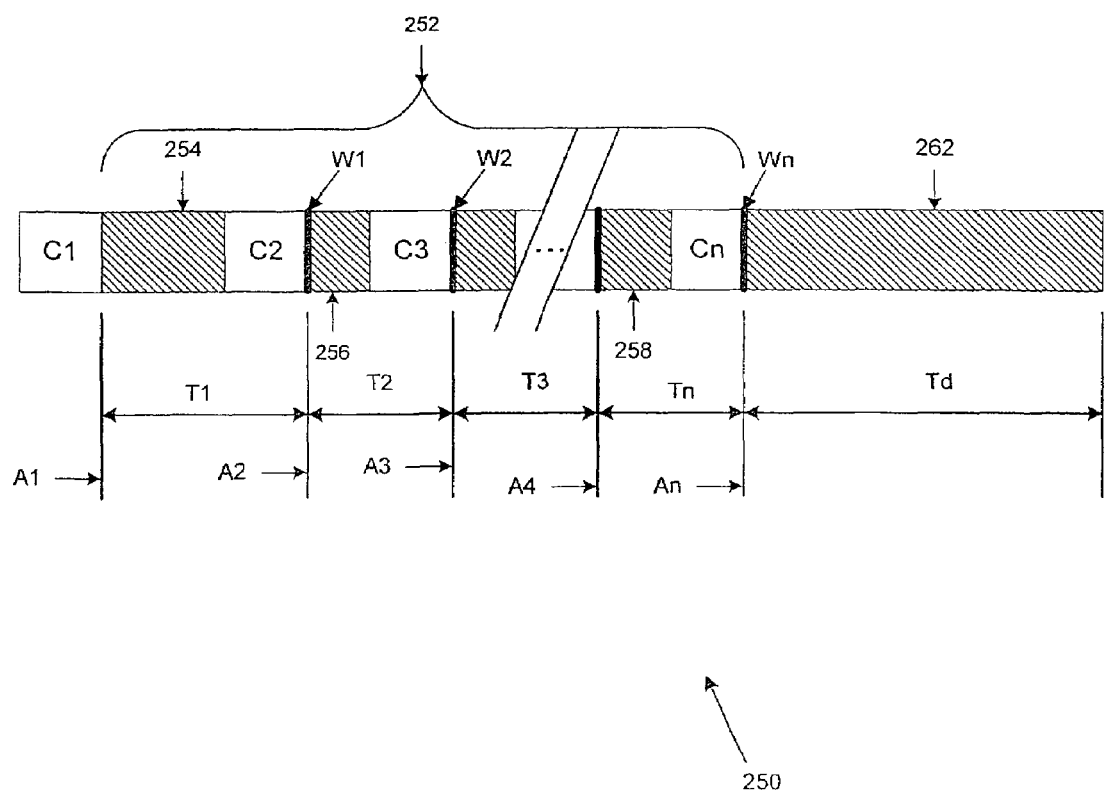

FIG. 2D illustrates a time-line of a password 250 that utilizes a plurality of password segments. Password 250 comprises time envelope 252 and entry signals C2, C3, . . . , and Cn, time intervals 254, 256, . . . , and 258, and deviation windows W1, W2, . . . , and Wn. Time envelope 252 is calculated from the trailing edge of initializing entry signal C1 to the trailing edge of entry signal Cn. Initializing entry signal C1 is detected by password software 132. The interval timer is then reset and begins timing time interval T1 at time A1. Time interval 254 is determined by subtracting the time of entry signal C2 time from time T1. Time T1 is the sum of time interval 254 and the time of entry signal C2 with a deviation factor of plus or minus a predetermined percentage of the total time. Deviation window W1 is typically a ten percent (10%) deviation.

Time interval 256 is determined by subtracting the time of entry signal C3 from time T2 which ends within deviation window W2. Time T2 is measured from the trailing edge of entry signal C2 to the trailing edge of entry signal C3. All the time intervals in this embodiment are determined in the same manner as time interval 254 and time interval 256. Times T1, T2, . . . , Tn may be utilized in an embodiment of the password, along with time intervals and deviation windows, as validation factors for a presented password attempt. Time Td is an arbitrary time delay 262 added when password software 132 sends an "access denied" signal or an "access allowed" signal to computer 106.

Figure 2E:
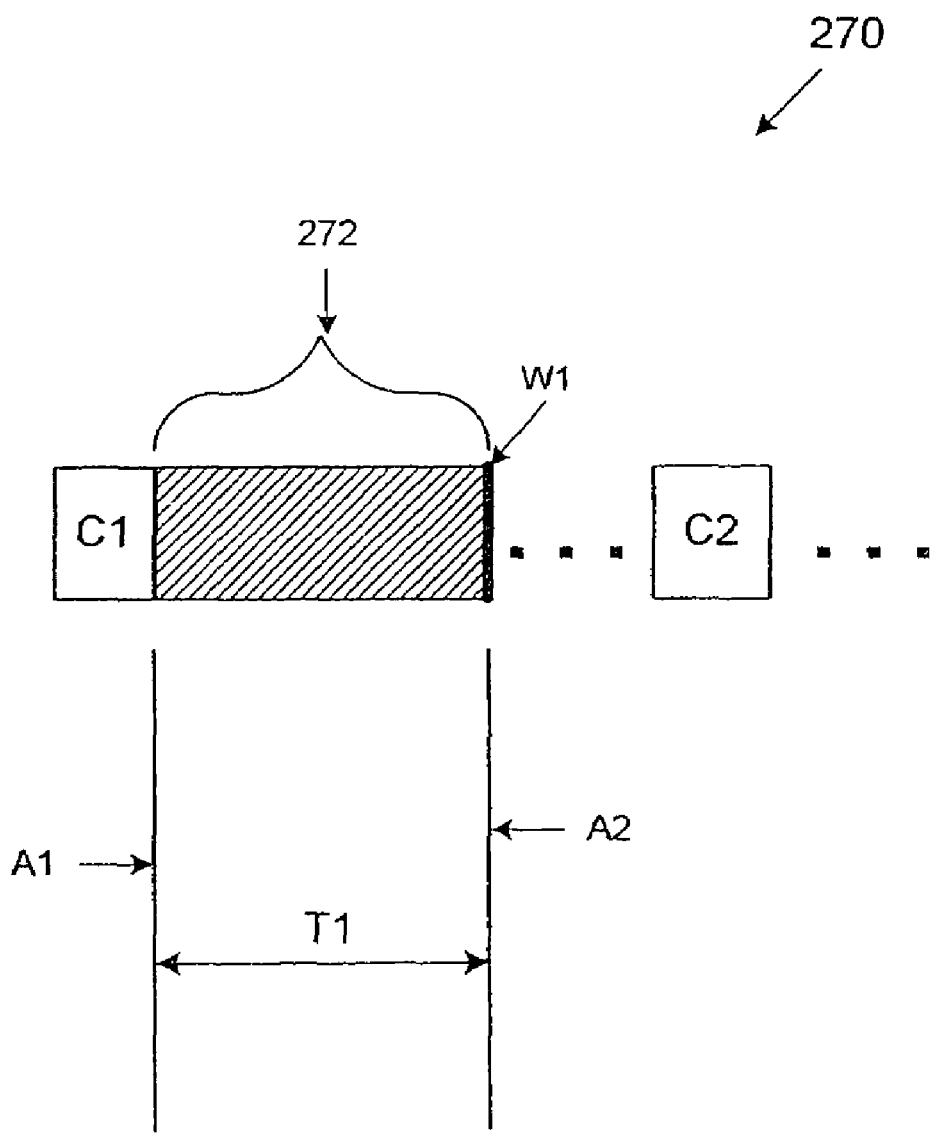

FIG. 2E depicts a time-line of a "time lockout" password 270 of the present invention. Initializing entry signal C1 signals password software 132 that a password attempt is being presented. The interval timer is reset and started at time A1. Time T1 272 is measured from the trailing edge of entry signal C1. Time T1 272 acts as a "time lockout" so that no other character entries will be considered by password software 132 before the interval timer, which began timing at time A1 completes time interval 272. Any entry signal attempts from computer 106 will be answered with an arbitrary time delay Td (not shown) and an "access denied" signal sent to computer 106. Furthermore, time T1 must be complete (i.e., timed lockout ends within deviation window W1) before another entry event will be considered by password software 132. For example, a user may want to secure his computer overnight. In the process of activating the overnight password, the computer prompts the user for the password character(s) and the length of the desired lockout time T1. After the lockout time T1 has elapsed, password software 132 will then consider password entry attempts. Even so, the correct password, in this example entry event C2, must be entered to permit access to computer 100.

Each of the time intervals in a password can be any user-determined period of time. Further, the identity of the additional characters can (and should) be different from one another. A user can select time intervals and entry signals for inclusion in a password. Table 1 provides more detailed information concerning time intervals and entry signals for the time-line of password 250 shown in FIG. 2D.

TABLE 1

| Time Interval | Entry Event | Entry Event Time | Time T | Deviation |
|---|---|---|---|---|
| | C1 | | | |
| 999 ms (254) | C2 | 1 ms | 1000 ms | 900 ms < W1 < 1100 ms |
| 498 ms (256) | C3 | 2 ms | 500 ms | 450 < W2 < 550 ms |
| . . . | . . . | . . . | . . . | . . . |
| n ms (258) | Cn | 3 ms | (n + 3) ms | n ± 0.1 (N + 3) ms |

Table 1 indicates that password software 132 would read the first two segments in a maximum time of 1650 milliseconds (ms) Any additional time intervals and entry events add to the time of the time envelope. However, this does not include the variable and arbitrary time delay Td to disguise the actual length of time of the password.

The following password format is a literal representation of one embodiment of the password algorithm:

$$C1@A1+C2@A2+C3@A3+\ldots+Cn@An+Td \quad (1)$$

where "C1" is a password initiating entry signal (or entry event); "A1" is the point that the interval timer is reset and begins timing; "A2, A3 . . . and An" are the timing points for subsequent entry events and time intervals; "C2, C3, etc.," are individual entry events that can comprise one or more computer readable signals which include characters, numbers, symbols, etc.; "Cn" is the "nth" entry event; and "Td" is a variable time delay that password software 132 waits after determining whether a password attempt is acceptable to disguise the true time of the stored password when allowing or denying entry.

As discussed previously, one of the most common schemes used by hackers is a so-called "dictionary" attack. A dictionary attack provides multiple combinations of entry events, but requires continual confirmation from the computer system under attack to confirm any correct entries. A powerful feature of the present invention requires that the hacker wait until the entire password attempt is entered before determining whether the password attempt is correct. By restricting the confirmation of a successful password attempt until the password attempt is complete in real time, the present invention prevents a hacker from determining whether progress is being made. Effectively, the hacker has to wait for the entry of a complete password attempt, which may require a time of several microseconds, or eight hours, or many days.

For example, if an authorized user selected a password that included multiple time entries and entry events that totaled ten (10) seconds, each password attempt would have to be exactly tem (10) seconds long. A hacker using computer 106 would only be permitted a password attempt once every ten (10) seconds. Even if the hacker was aware that a time based password was protecting computer 100 and presented time markers for verification, the password confirmation of the present invention includes a variable time delay, Td, that password software 132 adds before sending the message "access denied." This variable, and arbitrary, time delay is added to the password attempt and masks the true length of the stored password. The combinations could be virtually endless. A stored password could have a total time interval of eight hours or more. A stored password that might have a length of eight hours or more would discourage most hackers. Additionally, the arbitrary and variable time delay that password software 132 waits before responding to computer 106 provides a mask for the true time envelope of the stored password.

Figure 3:
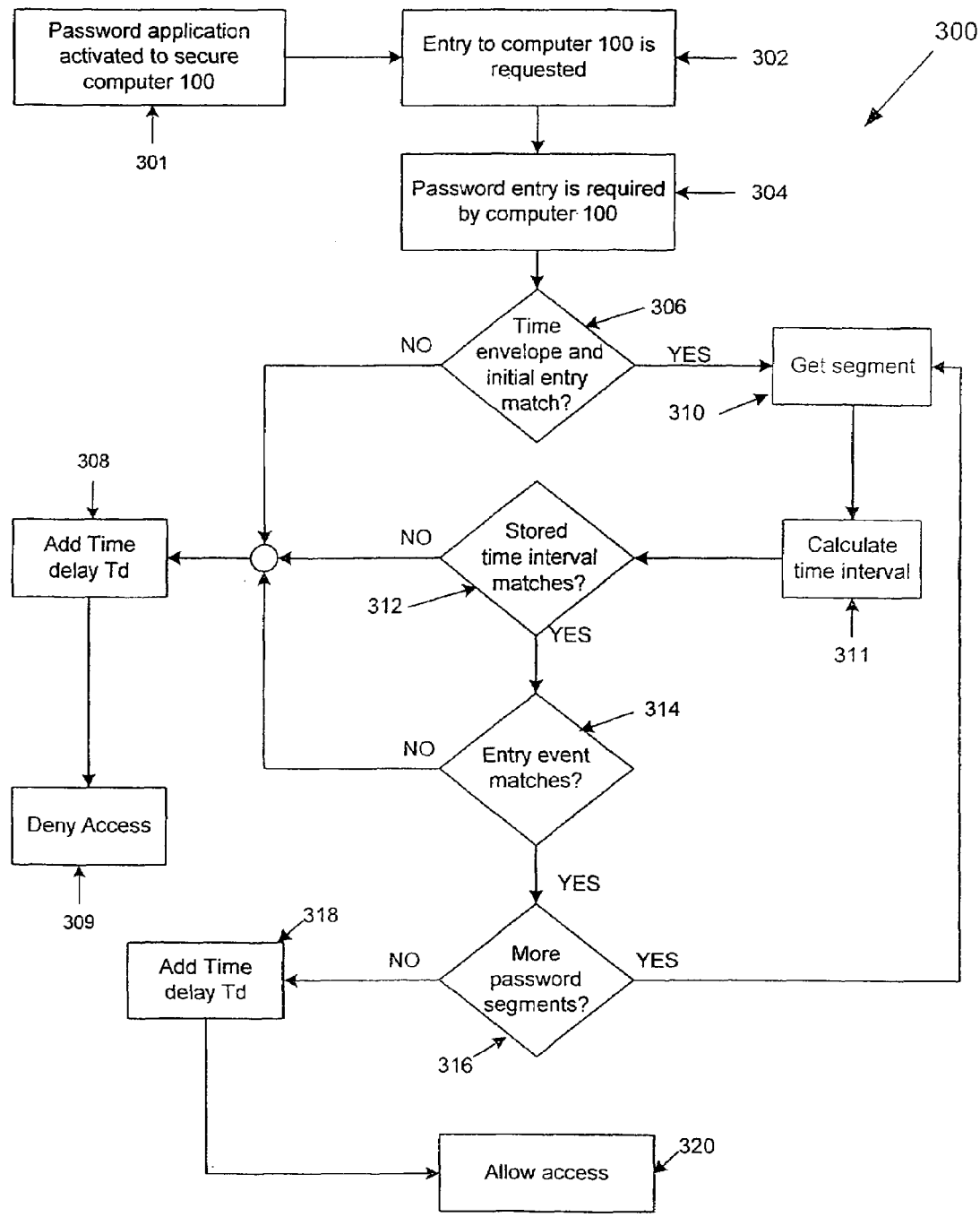
FIG. 3 is a high-level flow diagram illustrating the steps of an exemplary method of protecting a computer system in accordance with the teachings of the present invention.

FIG. 3 depicts a high-level flow diagram illustrating the operation of an exemplary computer password protection system according to one advantageous embodiment of the present invention. The process steps are generally referred to with reference numeral 300. The process begins with a password being established and stored in computer 100, where computer 100 is subject to online entry, either authorized or unauthorized (process step 301). After the stored password is in place, an online entity (for purposes of this example, attacking computer 106) attempts to gain access to computer 100 via a modem or other communication interface device (process step 302). Protected computer 100 signals to the attacking computer 106 that a password is required (process step 304).

The attacking computer 106 transmits a password attempt in order to gain entry to the protected computer 100. Since the stored password of the present invention requires a complete password attempt before notifying attacking computer 106 of success or failure, a determination is made whether the time envelope (time measured from the first keystroke to the last keystroke) of a completely entered password attempt matches the stored password. After detecting an initial entry event (signal), the presented password attempt must be completely entered and submitted before any entry confirmation or denial is sent to attacking computer 106 (process step 306).

If the time envelope of the presented password attempt does not match the time envelope of the stored password for protected computer 100, the method of the present invention waits for an arbitrary time, time Td (process step 308) and access is denied to attacking computer 106 (process step 309). If the time envelope of the password attempt entered by attacking computer 106 matches the time envelope of the stored password, then protected computer 100 gets a first password segment (process step 310). Next, the method calculates the first time interval of the first segment (process step 311). If the first time interval (i.e., the time T1 minus the time of the entry event in the time segment) does not match the stored time interval of the first segment (process step 312), then the method of the present invention waits for an arbitrary time, time delay Td (process step 308) before notifying attacking computer 106 that access is denied (process step 309).

If the determination is made that the time interval of the first password segment of attacking computer 106 matches the time interval of the first segment of the stored password in computer 100, then the method of the present invention makes a determination of whether the entry event associated with the time interval matches the corresponding entry event of the stored password (process step 314). If there is no match, the method of the present invention waits for an arbitrary time, time delay Td (process step 308), and denies access to attacking computer 106 (process step 309). If there is a match, then the method of the present invention determines whether there are more password segments to be checked (process step 316). If there are more password segments, the method of the present invention then gets the next password segment (process step 311) and repeats the cycle of determining whether entry events and time intervals match (process steps 311-314).

If a determination is made in process step 316 that there are no more password segments (time interval and associated entry events) detected in the incoming password attempt, the incoming password attempt is deemed to present a valid password. The computer then waits an arbitrary period of time, Td, to mask the true length of the time envelope of the stored password (process step 318). The method of the present invention then grants access to protected computer 100 (process step 320).

The exemplary embodiments described above may be constructed from entries received from a computer keyboard. In other words, a user may design a stored password and password software 132 constructs the designed stored password. However, a stored password may be constructed automatically by utilizing a password software 132 that comprises a random character generator. Password software 132 can construct a stored password by inserting characters or signals for each entry event and by designating time intervals between the entry events. Thus, it is possible to generate a stored password that may be unknown to the password holder but is stored on a floppy disk (or other similar memory device). The password holder can use the password on a floppy disk to obtain access to computer 100. For remote access to computer 100, the holder of the stored password inserts the floppy disk into a remote computer 106. The floppy disk provides the stored password for remote entry access to protected computer 100. Even though storage of the stored password on a floppy disk may make computer 100 less secure, the stored password is useful if authorized access from a remote computer is required.

Figure 4:
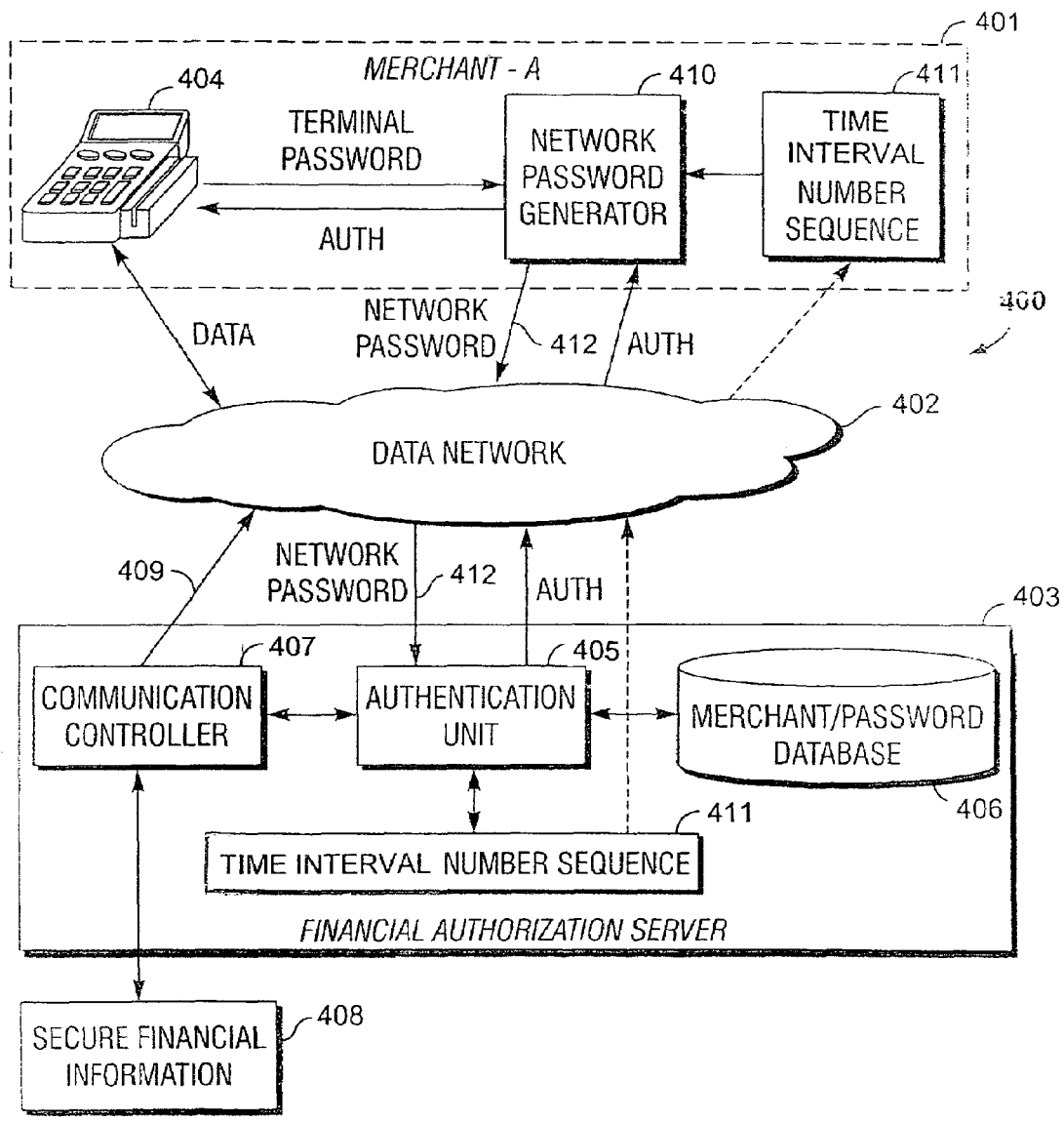
FIG. 4 is a simplified functional block diagram of an exemplary financial authorization network modified in accordance with the teachings of the present invention.

FIG. 4 is a simplified functional block diagram of an exemplary financial authorization network 400 modified in accordance with the teachings of the present invention. A plurality of merchant terminals such as Merchant-A 401 communicate through a data network 402 with a financial authorization server 403. Each merchant terminal 404 includes a magnetic card reader or equivalent device for inputting customer identification and/or credit information. The merchant terminals may be further connected on the merchant side with a point-of-sale (POS) system or intranet (not shown). The data network may be, for example, an Internet Protocol (IP)-based local area network (LAN), wide area network (WAN), or the Internet. The financial authorization server may include an authentication unit 405, a merchant/password database 406, and a communication controller 407.

In conventional operation, each merchant, for example Merchant-A 401, activates his terminal each morning when the merchant prepares to open for business. The terminal includes a serial number, and the merchant enters an ID number or password assigned to him by the operator of the financial authorization network. Together, the serial number and the ID number/password comprise a prior art terminal password that is transmitted through the data network 402 to the financial authorization server 403. The terminal password is received in the authentication unit 405, which accesses the merchant/password database 406 and compares the received terminal password with a stored password. If the passwords match, the authentication unit approves Merchant-A's terminal for financial transactions and sends an approval indication to the terminal. Thereafter, when a customer's credit card is read at the merchant terminal 404, the card number together with the terminal serial number are sent to the financial authorization server. The authentication unit 405 recognizes the serial number as being approved and sends the credit card information to the communication controller 407. The communication controller then accesses secure financial information 408 to determine whether the credit card number is approved for the transaction. The controller then returns either a positive or negative indication 409 to the Merchant-A terminal.

In some networks, the merchant terminal may send its terminal password along with each credit card transaction.

When the authentication unit 405 positively authenticates the password, the credit card information is passed to the communication controller 407 for access to the secure financial information 408.

In the present invention, the merchant terminal environment is modified to include a network password generator 410. The network password generator may be implemented internally in the merchant terminal or in a separate unit that interfaces with the merchant terminal. The terminal sends its standard terminal password (e.g., serial number and merchant ID) to the network password generator. A time interval number sequence 411 is also input to the network password generator, which generates a time-multiplexed network password 412 by inserting the appropriate time intervals between the packets of the terminal password, as specified by the time interval number sequence. The time interval number sequence may be input via a standard network connection from the financial authorization server, via a secure encrypted connection, or via a physical medium such as a CD delivered to the merchant.

The network password generator 410 then sends the time-multiplexed network password 412 through the data network 402 to the server 406. The authentication unit 407 receives the network password and compares the characters received with a stored password in a merchant/password database 408. The authentication unit also compares the time intervals between the received characters with the current number set from the time interval number sequence 411, which is shared between the terminal and the server. The authentication unit positively authenticates the network password only if the received characters match the stored characters, and the time intervals between the received character-carrying packets matches the number specified by the time interval number sequence.

If the network password 412 is accompanied by a credit card number from a credit card transaction, and the authentication unit network positively authenticates the password, the credit card information is passed to the communication controller 407 for access to secure financial information 408.

In an alternative embodiment, the time interval number sequence 411 is stored only in the authorization server 403. Following a successful verification, the server sends a response message back to the merchant terminal. The response may include a next interval or set of intervals to be used by the terminal to create the time multiplexed network password. The intervals may be encoded in the response message to prevent interception by hackers or snoopers. Alternatively, the response message may include a value or values that do not directly indicate the time interval(s) to be inserted by the terminal. Instead, the terminal may be programmed with a formula that calculates the time intervals based on the value(s) received from the server. Alternatively, the terminal may include a lookup table that associates each value received from the server with a corresponding time interval to be inserted in the password.

For example, if the same time interval is to be placed between each of the characters in the password, the server may send a single value such as 24. The terminal may calculate a time interval from the value 24, or may associate a time interval with the value 24 in a lookup table, to determine that an interval such as 150 ms is to be placed between each character in the password. If a different time interval is to be placed between each of the characters in a password having, for example, 5 characters, the server may send a string of values such as 24, 10, 18 and 5. The terminal may calculate a time interval from each of the received values, or may associate a time interval with each of the received values in a lookup table, to determine four time intervals to place between the five characters. For example, time intervals such as 150 ms, 75 ms, 250 ms, and 1 second may be determined and each character is then transmitted individually, separated from the previous character by the determined time interval. Alternatively, the lookup table may associate a single value with a sequence of time intervals. Thus, the server may send a single value such as 24, and the terminal may determine that the intervals 150 ms, 75 ms, 250 ms, and 1 second are to be placed between the characters in the password.

Figure 5:
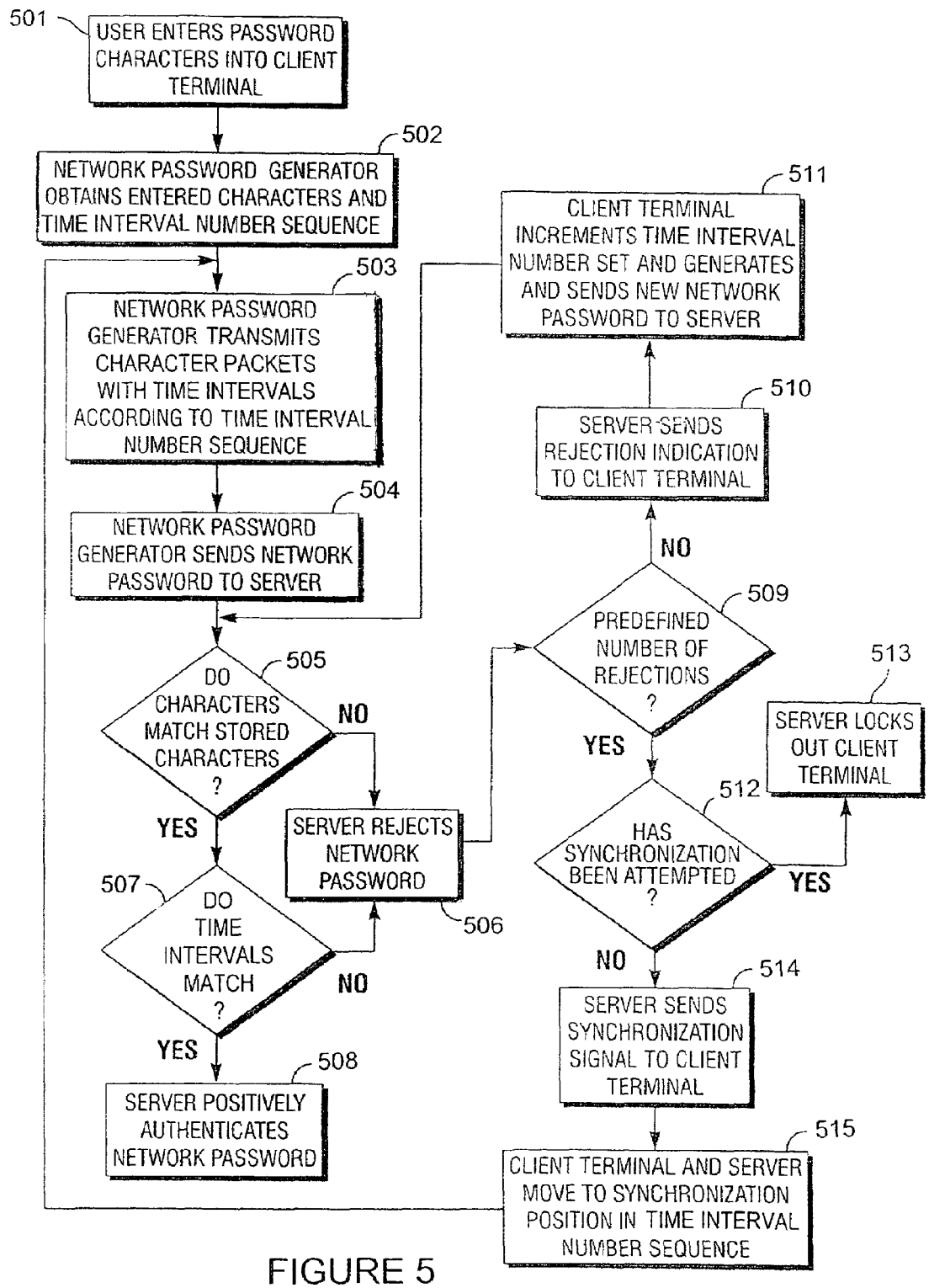
FIG. 5 is a high-level flow diagram illustrating the steps of an exemplary embodiment of a method of generating and authenticating a password in accordance with the teachings of the present invention.

FIG. 5 is a high-level flow diagram illustrating the steps of an exemplary embodiment of a method of generating and authenticating a password according to the teachings of the present invention. Starting at step 501, a user enters the characters of a password into a client terminal. At step 502, a network password generator associated with the client terminal obtains the entered password characters from the client terminal and obtains a time interval number sequence that is shared with an authentication server. At step 503, the network password generator places the characters in packets and transmits the character packets with the appropriate time intervals between the packets in accordance with the time interval number sequence. At step 504, the network password generator sends the network password to the server.

Prior to transmitting the packet with the first password character, the client terminal may transmit a number of test packets known as "pings" to the server separated by known time intervals in order to pre-establish a path through the network and obtain preliminary information regarding tolerances to be applied to the time intervals between the password packets. The server sends back replies noting the time of reception of each ping. It has been noted that the timing values returned by the server vary significantly for the first few pings. After approximately six to eight pings, the timing values settle down to a predictable tolerance value because a pathway is established and is being re-used by subsequent pings. This established tolerance timing value may then be used as an input for setting timing tolerance values for the password packets due to the physical characteristics of the infrastructure in the communication link.

At step 505, an authentication unit associated with the server determines whether or not the characters received in the network password match the characters of a stored password associated with the client terminal. If not, the process moves to step 506 where the server rejects the network password. However, if the characters match at step 505, the process moves to step 507 where the authentication unit determines whether or not the time intervals between each pair of character-carrying packets matches the time intervals specified by the time interval number sequence. If the time intervals match at step 507, the process moves to step 508 where the server positively authenticates the network password. However, if the time intervals do not match, the process moves to step 506 where the server rejects the network password.

The process then moves to step 509 where the server determines whether this client terminal has experienced a predefined number of password rejections. If not, the process moves to step 510 where the server sends a rejection indication to the client terminal. At step 511, the client terminal increments the time interval number set and generates and sends a new network password to the server. The process then returns to step 505 and repeats the authentication process for the new password.

If it is determined at step 509 that the client terminal has experienced the predefined number of password rejections, the process moves to step 512. Since multiple password rejections may be caused by the client terminal and server being out of synch regarding the correct position in the time interval number sequence, the process determines at step 512 whether or not synchronization has already been attempted. If so, the process moves to step 513 where the server locks out the client terminal. However, if synchronization has not yet been attempted, the process moves to step 514 where the server sends a synchronization signal to the client terminal specifying a synchronization position in the time interval number sequence, or alternatively, instructing the client terminal to go to a predefined synchronization position. At step 515, both the client terminal and the server move to the synchronization position in the time interval number sequence. The process then returns to step 503 where the network password generator generates a new password using the characters entered by the user and inserting time intervals between the character-carrying packets in accordance with the synchronization position in the time interval number sequence. The process then continues with the authentication procedure. If the client terminal is an authorized terminal that was temporarily out of synch with the server, the synchronization process should correct the problem, and the password should be positively authenticated. If the client terminal is a hacker, who does not know to insert time intervals or does not have access to the time interval number sequence, the synchronization process will not correct the problem, and the hacker will be denied access.

A benefit of the present invention is that it is transparent to the user. That is, the user always uses the same terminal (with the same serial number) and the same password or ID for every transaction. The terminal and server change the network password as often as the network operator desires by changing the time intervals between packets in the manner and at the frequency defined by the network operator. The user does not have to remember multiple passwords or change his password on a periodic basis. Even if a hacker knows the user's password, the hacker cannot gain access. Since any time interval can be inserted between any two characters in the password, the combination of characters and time intervals is practically limitless. Also, the system may change the time intervals between each pair of password characters as often as each transaction. Therefore, even if a hacker intercepts a transmission and determines the time intervals between each pair of character-carrying packets, the intervals may change in the next transmission, denying the hacker access to the network.

Figure 6:
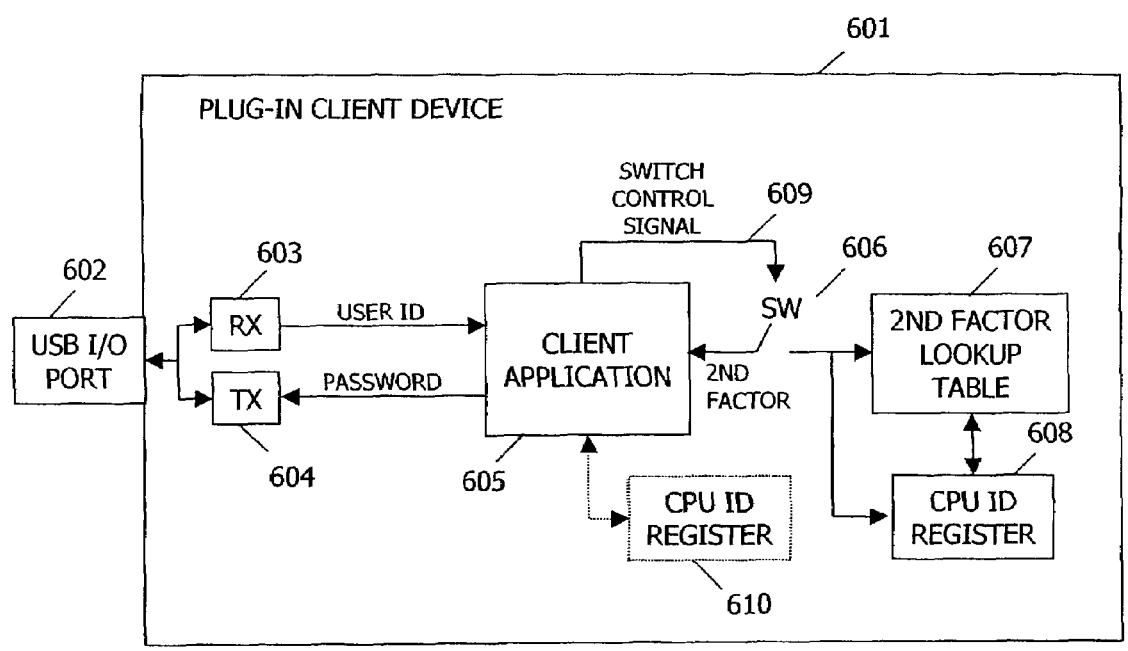
FIG. 6 is a high level functional block diagram of a plug-in client device in accordance with one embodiment of the present invention.

FIG. 6 is a high level functional block diagram of a plug-in client device 601 in accordance with one embodiment of the present invention. In the exemplary embodiment illustrated, the client device plugs into a user's computer or PC using a Universal Serial Bus (USB) input/output (I/O) port 602. Of course, the device may alternatively connect to the PC through other types of I/O ports, either wired or wireless. The USB port provides a receiving function 603 and a transmitting function 604 providing communications with a client application 605 loaded on the device. A mechanical switch 606 physically connects or disconnects the client application from a second-factor lookup table 607 and a CPU ID register 608. A switch control signal 609, generated by the client application, may control the opening and closing of the mechanical switch in particular embodiments. The operation of the plug-in client device will be discussed in more detail below.

Figure 7:
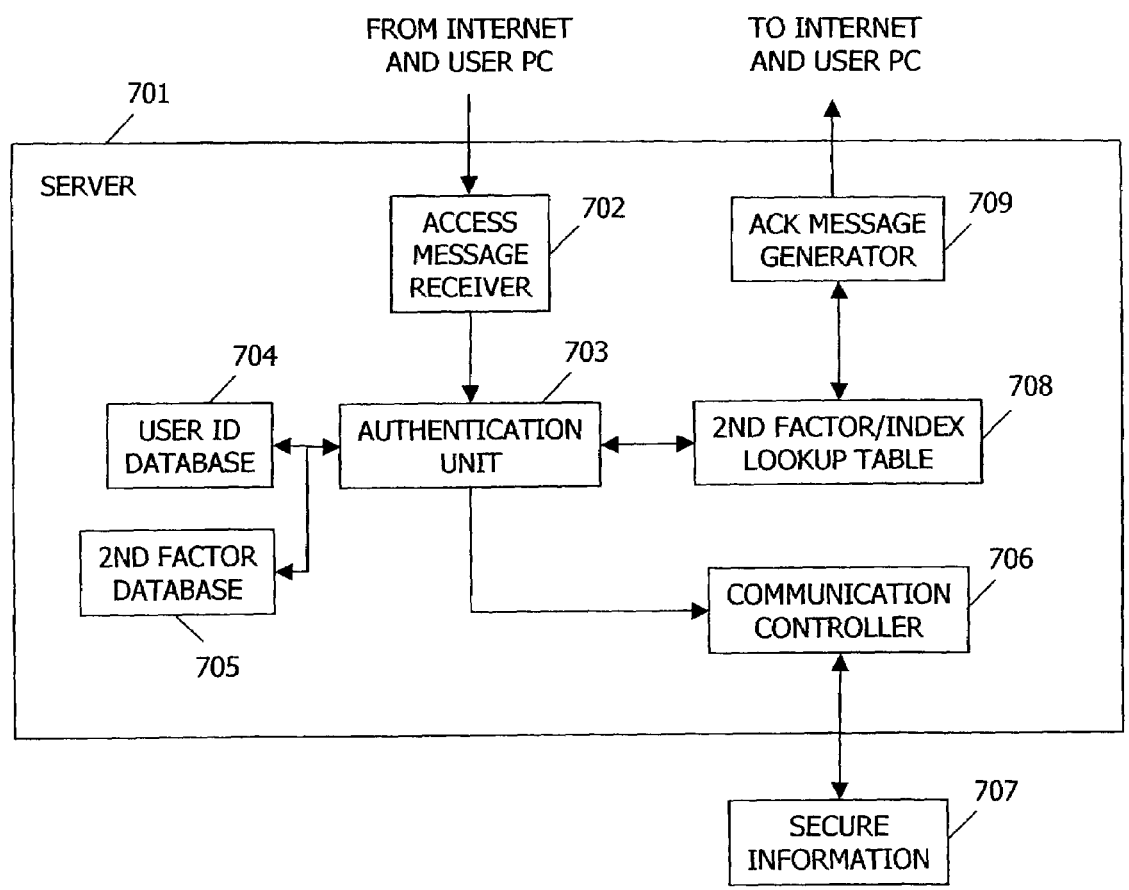
FIG. 7 is a simplified functional block diagram of an exemplary authentication server modified in accordance with the present invention.

FIG. 7 is a simplified functional block diagram of an exemplary authentication server 701 modified in accordance with the present invention. An access message receiver 702 receives an access request from the Internet and the user's PC. The access request includes a two-factor password, which is sent to an authentication unit 703. The authentication unit verifies the password by first accessing a User ID database 704 and comparing the User ID portion of the password to a User ID stored in the User ID database. The authentication unit also accesses a second-factor database 705 and compares the second factor portion of the password to a second factor stored in the second factor database. The authentication unit positively verifies the password only if both the User ID and the second factor match. If both match, the authentication unit authorizes a communication controller 706 to provide the user with access to the secure information 707.

Following either a positive or negative verification, the server 701 returns an acknowledgment (ACK) or a negative acknowledgment (NACK) to the user's PC. In both the ACK and the NACK, the server may include a new index value for the second factor lookup table 607 in the plug-in client device 601. If for some reason, the client device used the wrong second factor, the inclusion of a new index value in the NACK should resynchronize the PC and the server.

In one embodiment, the server 701 retrieves the new index value from a second factor/index lookup table 708. Once an index value and second factor are selected, the second factor is sent to the second factor database 705, and the index value is sent to an ACK (or NACK) message generator 709. The ACK/NACK message is then sent to the user's PC together with the new index value.

In an alternative embodiment, the access message received from the user's PC includes the index value in addition to the password. The authentication unit 703 compares the User ID portion of the password to a User ID stored in the User ID database 704. The authentication unit then accesses the second factor/index lookup table 708 using the index value received in the access message. The authentication unit then compares the received second factor with the second factor associated with the index value in the second factor/index lookup table. Thus in this embodiment, the separate second factor database 705 is not required.

Referring again to FIG. 6, the plug-in client device may be utilized to provide a PC with secure password communication with the server 701. The mechanical switch 606 is normally in the open position so that there is no access to the second-factor lookup table 607 or the CPU ID register 608. In one embodiment, when the user connects the device to the PC's USB port, the user physically moves the mechanical switch to the closed position, providing the client application 605 with access to the lookup table and the CPU ID register. The client application then performs a mutual authentication procedure with the host PC. The ID of the host PC's CPU and a Device ID from the client device are exchanged and recognized as being authorized for mutual operation. The host PC generates a connection context, which is downloaded to the client device via a cable connection or, in the case of a wireless connection, by means of an ultra wideband (UWB) radio like with PK technology or by means of near field communications.

The first time the plug-in client device is used with the host PC, the CPU ID is stored in the CPU ID register 608. Thereafter, each time the plug-in client device is connected to a host, the client application retrieves the CPU ID from the host and compares the retrieved CPU ID with the stored CPU ID. The plug-in client device will operate only with a PC having a CPU ID stored in the CPU ID register. Thus, if the device is lost or stolen, it cannot be utilized with another computer to access the secure information 707.

When the user types in his User ID and hits "Enter", the User ID is sent through the USB I/O port 602 to the plug-in client device 601. The receiving function 603 sends the User ID to the client application 605, which accesses the second-factor lookup table 607 and the CPU ID register 608. The client application verifies that the CPU ID is correct, and then retrieves the second factor from the lookup table. The client application then combines the User ID and the second factor to produce a two-factor password. The two-factor password is passed through the transmitting function 604 and out the USB I/O port 602 to the user's PC. The PC then transmits the two-factor password to the server 701 for authentication. A browser plug-in may be utilized to interface with the plug-in client device when the two-factor password is being sent to a server over the Internet.

In the preferred embodiment, after a predefined time period, or upon the occurrence of a predefined event, the client application 605 activates the switch control signal 609 to open the mechanical switch 606. The predefined event may be the transmission of the two-factor password or the reception of an indication that the password was successfully authenticated by the server. Opening the mechanical switch physically isolates the second-factor lookup table and the CPU ID register from the PC and the Internet. Thus, hackers are prevented from accessing the lookup table and thereby determining future two-factor passwords.

In an alternative embodiment, a CPU ID register 610 is implemented so that the client application 605 may access it without closing the mechanical switch 606. In this embodiment, when the plug-in client device 601 is connected to the PC, the client application verifies the CPU ID of the PC. If the CPU ID matches the CPU ID stored in the CPU ID register 610, the client application 605 activates the switch control signal 609 to close the mechanical switch 606, thereby providing access to the second-factor lookup table 607.

In yet another embodiment, the client application does not control the mechanical switch at all. Instead, the user physically closes the switch when he desires to perform a secure two-factor password authentication, and opens the switch when the authentication is complete.

In other embodiments, there are variations in the CPU ID verification. In one such embodiment, the verification is not performed, enabling the plug-in client device 601 to be utilized with any PC. In another embodiment, the CPU ID register 608 may store the CPU IDs of several PCs. In this way, the user may program the device to operate with several PCs such as a home PC, a laptop, and an office PC. All other PCs would not be recognized.

The location and function of the mechanical switch 606 may vary in additional ways. For example, the switch may be located between the USB I/O port 602 and the client application 605. When the switch is open, there is no access to the client application via the host PC. Additionally, the switch may be configured to open and close only the data line while maintaining power through the USB connection to the client device.

It is important to note that while the present invention has been described in the context of a fully functional computer system, and an exemplary financial authorization network, those skilled in the art will appreciate that the instructions for practicing the method of the present invention are capable of being recorded on any type of a computer readable medium. The steps of the method of the present invention are executed, regardless of the particular type of signal-bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A client device for constructing a two-factor password utilized by an authentication device to authenticate an accessing computer, said client device comprising:
   an input/output (I/O) port for interfacing the client device with the accessing computer, said I/O port receiving a user identification (user ID) from the accessing computer, and sending the two-factor password to the accessing computer;
   a database for storing a second factor; and
   a client application connected to the I/O port and the database, said client application being adapted to:
      retrieve the second factor from the database;
      combine the user ID and the retrieved second factor to form the two-factor password; and
      send the two-factor password to the I/O port for sending to the accessing computer;
   wherein the user ID includes a plurality of predefined characters, and the second factor includes a plurality of predefined time intervals, and the client application is adapted to form the two-factor password by instructing the accessing computer to individually transmit each of the plurality of predefined characters to the server, wherein each character is separated from a previous character by a time interval drawn from the plurality of predefined time intervals.

2. The client device of claim 1, wherein the I/O port is a Universal Serial Bus (USB) interface.

3. The client device of claim 1, wherein the I/O port is a wireless access link.

4. The client device of claim 1, further comprising a mechanical switch located between the client application and the second-factor database, wherein when the mechanical switch is open, the second-factor database is physically separated from the client application and the accessing computer.

5. The client device of claim 4, wherein the mechanical switch is adapted to be physically closed by a user to begin construction of the two-factor password, and is adapted to be physically opened by the client application upon expiration of a predefined time period or occurrence of a predefined event.

6. The client device of claim 5, wherein the mechanical switch is adapted to be physically opened by the client application when the two-factor password is sent to the accessing computer.

7. The client device of claim 5, wherein the mechanical switch is adapted to be physically opened by the client application when an indication is received from the accessing computer indicating that the two-factor password has been positively authenticated by the authentication device.

8. The client device of claim 1, further comprising a central processing unit identification (CPU ID) register for storing a CPU ID of the accessing computer, wherein the client application is adapted to compare the stored CPU ID with the CPU ID of any computer to which the plug-in client device is connected, and to enable access to the second-factor lookup table only if the CPU IDs match.

9. The client device of claim 1, further comprising a mechanical switch located between the I/O port and the client application, wherein when the mechanical switch is open, the client application and the second-factor database are physically separated from the accessing computer.

10. The client device of claim 9, wherein the mechanical switch opens and closes a data connection between the accessing computer and the client device while maintaining a power connection from the accessing computer to the client device.

11. A system for protecting a network against unauthorized access while enabling an authorized accessing computer to access the network, said system comprising:
 a client device that connects to the authorized accessing computer, said client device constructing a two-factor password utilized by an authentication server to authenticate the accessing computer, said client device comprising:
  an input/output (I/O) port for interfacing the client device with the accessing computer, said I/O port receiving a user identification (user ID) from the accessing computer, and sending the two-factor password to the accessing computer;
  a database for storing a second factor; and
  a client application connected to the I/O port and the database, said client application being adapted to:
   retrieve the second factor from the database;
   combine the user ID and the retrieved second factor to form the two-factor password; and
    send the two-factor password to the I/O port for sending to the accessing computer; and
 an authentication server connected to the network for receiving the two-factor password and authenticating the accessing computer, said authentication server comprising:
  means for receiving the two-factor password sent from the accessing computer;
  means for determining whether the received user ID matches a stored user ID associated with the accessing computer;
  means for determining whether the received second factor matches a stored second factor associated with the accessing computer; and
  means for positively authenticating the accessing computer only if the received user ID matches the stored user ID, and the received second factor matches the stored second factor;
 wherein the user ID includes a plurality of predefined characters, and the second factor includes a plurality of predefined time intervals, and the client application is adapted to form the two-factor password by instructing the accessing computer to individually transmit each of the plurality of predefined characters to the server, wherein each character is separated from a previous character by a time interval drawn from the plurality of predefined time intervals.

12. The system of claim 11, wherein the means within the authentication server for determining whether the received second factor matches a stored second factor includes:
 A timing apparatus for measuring time intervals between the received characters of the user ID; and
 Means for determining whether the measured time intervals match stored time intervals associated with the accessing computer.

13. A method of protecting a network against unauthorized access while enabling an authorized accessing computer to access the network, said method comprising:
 receiving from a user, a user identification (user ID);
 automatically constructing by the accessing computer, without further input from the user, a two-factor password comprising the user ID and a second factor added by the accessing computer, said two-factor password being utilized by an authentication server to authenticate the accessing computer;
 sending the two-factor password to the authentication server;
 verifying by the authentication server that the two-factor password received from the accessing computer matches a stored two-factor password associated with the accessing computer; and
 granting the accessing computer access to the network only if the two-factor password received from the accessing computer matches the stored two-factor password associated with the accessing computer;
 wherein the user ID includes a plurality of predefined characters, and the second factor includes a plurality of predefined time intervals, and the step of automatically constructing the two-factor password includes individually transmitting each of the plurality of predefined characters to the authentication server, wherein each character is separated from a previous character by a time interval drawn from the plurality of predefined time intervals.

14. The method of claim 13, wherein the step of verifying by the authentication server that the two-factor password received from the accessing computer matches a stored two-factor password associated with the accessing computer includes:
 verifying that the received user ID matches a stored user ID associated with the accessing computer; and
 verifying that the received second factor matches a stored second factor associated with the accessing computer.

15. The method of claim 14, further comprising, prior to sending the two-factor password to the authentication server.

16. The method of claim 14, wherein the step of verifying that the received second factor matches a stored second factor associated with the accessing computer includes:
 measuring the authentication server, time intervals between the received characters of the user ID; and
 determining by the authentication server, whether the measured time intervals match stored time intervals associated with the accessing computer.

17. The method of claim 13, wherein the step of automatically constructing the two-factor password includes:
 connecting a cliet device to the accessing computer;
 automatically constructing the two-factor password by the client device; and
 passing the two-factor password to the accessing computer for transmission to the authentication server.

* * * * *